R. Scott,
Garden Plow.
No. 94,657. Patented Sep. 7, 1869.
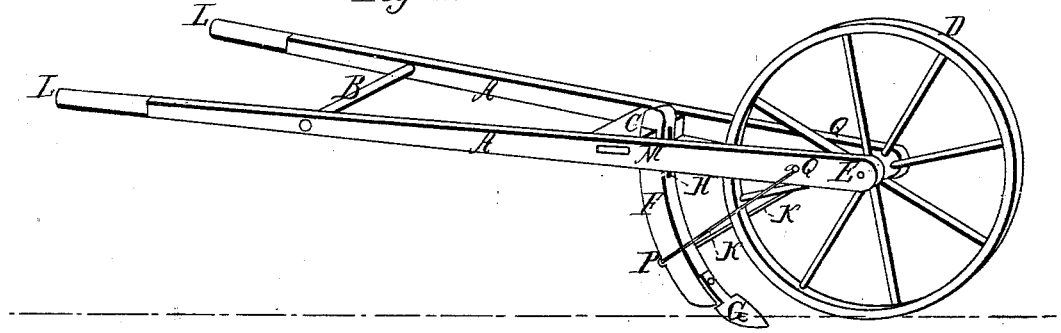
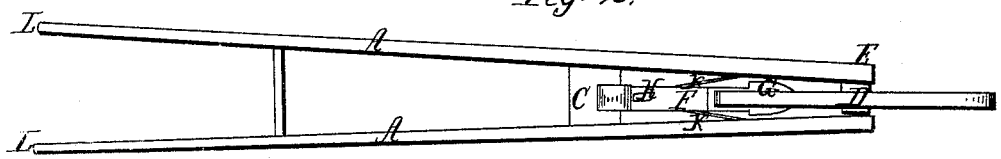
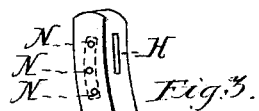
Witnesses,
Robert A. Hews
J. W. Munday
Inventor,
Robert Scott

UNITED STATES PATENT OFFICE.

ROBERT SCOTT, OF LA PORTE, INDIANA.

IMPROVED GARDEN-PLOW.

Specification forming part of Letters Patent No. 94,657, dated September 7, 1869.

*To all whom it may concern:*

Be it known that I, ROBERT SCOTT, of La Porte, in the county of La Porte and State of Indiana, have invented a new and useful Improvement in Garden-Plows; and I do hereby declare that the following is a full, clear, and exact description of the same, reference being had to the annexed drawings, making part of this specification, in which—

Figure 1 is a perspective view. Fig. 2 is a view looking from above, and Figs. 3 and 4 views of detached parts.

This plow may be used as a cultivator, a weeding-plow, or a marking-plow, or in any light work not requiring the strength of a horse.

In the drawings similar letters of reference indicate like parts.

A A represent wooden handles, joined together by the rung B and the head-block C, having at E an axle upon which revolves the wheel D. The upright post F fits into a notch cut into the head-block C, so that the shovel G may be lowered or raised, as occasion requires. The post F has a slot, H, through which protrudes a bolt from the head-block C, by means of which the post F may be secured at the required height. The post F is braced by the iron braces K K, fastened at the points Q Q and P.

The head-block C may be dispensed with, provided the handles A A are so bent as to fit close up to the sides of the post F, which may then be secured at the proper height by a bolt through the handles at the point M, and through one of the holes in the post F, (represented at N N N, Fig. 3.) A slot may be substituted for these holes N N N, covering the same space, as indicated by the dotted line in Fig. 3. The weeding-shovel or scarifier R, Fig. 4, may be substituted for the shovel G, according to the work to be done.

Having thus described my invention, I claim as new and desire to secure by Letters Patent—

1. The arrangement herein described of the handles A A, the head-block C, or the substitution therefor of the bent handles above described, the post F, with its braces K K, and the regulating-slot H, or the substitution therefor of the holes N N N, or the slot indicated by the dotted line in Fig. 3.

2. The wheel D, with a single shovel following after it, and the general wheelbarrow-like arrangement, whereby the plow is made easy to handle and push in a straight line, and whereby it may be raised or lowered by the handles, so as to plow deep or light, as occasion requires.

ROBERT SCOTT.

Witnesses:
ROBT. A. HEWS,
JAS. A. HEWS.